United States Patent
Garcia et al.

(10) Patent No.: US 8,612,750 B2
(45) Date of Patent: *Dec. 17, 2013

(54) CREATING AND USING SECURE COMMUNICATIONS CHANNELS FOR VIRTUAL UNIVERSES

(75) Inventors: Kelley K. Garcia, Poughkeepsie, NY (US); Rick A. Hamilton, II, Charlottesville, VA (US); Richard J. Newhook, Cherry Hill, NJ (US); Martin S. Ramsey, Bristol, CT (US); Raull Rangel, San Antonio, TX (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,362

(22) Filed: Aug. 15, 2012

(65) Prior Publication Data
US 2013/0019094 A1   Jan. 17, 2013

Related U.S. Application Data

(63) Continuation of application No. 12/326,477, filed on Dec. 2, 2008, now Pat. No. 8,291,218.

(51) Int. Cl.
*H04L 29/06* (2006.01)
*H04L 9/32* (2006.01)
*H04L 9/00* (2006.01)
*H04L 9/30* (2006.01)
*H04K 1/00* (2006.01)

(52) U.S. Cl.
USPC .......... 713/160; 713/162; 713/153; 713/168; 380/30; 380/33; 380/255

(58) Field of Classification Search
USPC ........................................................ 713/160
See application file for complete search history.

(56) References Cited

U.S. PATENT DOCUMENTS

| | | |
|---|---|---|
| 4,593,281 A | 6/1986 | Lare |
| 5,880,731 A | 3/1999 | Liles et al. |
| 6,229,553 B1 | 5/2001 | Farmer et al. |
| 6,266,704 B1 | 7/2001 | Reed et al. |
| 6,385,317 B1 | 5/2002 | Rix et al. |
| 6,721,424 B1 | 4/2004 | Radatti |
| 6,734,885 B1 | 5/2004 | Matsuda |
| 6,772,195 B1 | 8/2004 | Hatlelid et al. |
| 6,986,036 B2 | 1/2006 | Wang et al. |
| 7,113,601 B2 | 9/2006 | Ananda |

(Continued)

OTHER PUBLICATIONS

Hamilton, II et al., Office Action for U.S. Appl. No. 12/117,866, filed May 9, 2008 (U.S. Patent No. 8,051,462 B2), dated Jan. 27, 2011.

(Continued)

*Primary Examiner* — Carolyn B Kosowski
(74) *Attorney, Agent, or Firm* — Lisa Ulrich, Esq.; Kevin P. Radigan, Esq.; Heslin Rothenberg Farley & Mesiti P.C.

(57) ABSTRACT

A system and method provides secure channels for communication in a virtual universe by employing a packet interception layer for incoming and outgoing data packets. A data path is defined and is sequentially encrypted with the public keys of servers in the path. Decryption and identification of the next server occurs in a sequential manner in which the path is known only to the sender.

20 Claims, 5 Drawing Sheets

(56) References Cited

U.S. PATENT DOCUMENTS

| | | |
|---|---|---|
| 7,124,092 B2 | 10/2006 | O'Toole, Jr. et al. |
| 7,159,108 B2 | 1/2007 | Hariharan et al. |
| 7,269,730 B2 | 9/2007 | Stirbu |
| 7,398,388 B2 | 7/2008 | Xu et al. |
| 7,474,749 B2 | 1/2009 | Mauro |
| 7,778,931 B2 | 8/2010 | Rits |
| 7,840,668 B1 | 11/2010 | Sylvain et al. |
| 7,865,715 B2 | 1/2011 | Xu et al. |
| 7,865,717 B2 | 1/2011 | Calcev et al. |
| 7,877,597 B2 | 1/2011 | Hariharan et al. |
| 8,051,462 B2 | 11/2011 | Hamilton, II et al. |
| 2002/0048372 A1 | 4/2002 | Toh et al. |
| 2003/0037250 A1 | 2/2003 | Walker et al. |
| 2003/0051136 A1 | 3/2003 | Curtis et al. |
| 2003/0061496 A1 | 3/2003 | Ananda |
| 2003/0156134 A1 | 8/2003 | Kim |
| 2004/0068647 A1 | 4/2004 | Hariharan et al. |
| 2004/0179037 A1 | 9/2004 | Blattner et al. |
| 2004/0199402 A1 | 10/2004 | Walker et al. |
| 2007/0183600 A1 | 8/2007 | Smart |
| 2007/0258468 A1 | 11/2007 | Bennett |
| 2007/0276958 A1 | 11/2007 | Curtis et al. |
| 2008/0034197 A1 | 2/2008 | Engel et al. |
| 2008/0075279 A1 | 3/2008 | Yoon et al. |
| 2008/0080708 A1 | 4/2008 | McAlister et al. |
| 2008/0155078 A1 | 6/2008 | Parkkinen et al. |
| 2008/0201762 A1 | 8/2008 | Rits |
| 2008/0253571 A1 | 10/2008 | Rits |
| 2008/0262911 A1 | 10/2008 | Altberg et al. |
| 2009/0031023 A1 | 1/2009 | Golovinski |
| 2009/0138943 A1 | 5/2009 | Kawanaka |
| 2009/0172171 A1 | 7/2009 | Amir |
| 2009/0210803 A1 | 8/2009 | Brignull et al. |
| 2009/0216910 A1 | 8/2009 | Duchesneau |
| 2009/0228708 A1 | 9/2009 | Trostle |
| 2009/0249228 A1 | 10/2009 | Cheng et al. |
| 2009/0254968 A1 | 10/2009 | Bussani et al. |
| 2010/0086132 A1 | 4/2010 | Tavernier et al. |
| 2010/0125635 A1 | 5/2010 | Axelrod et al. |
| 2010/0229235 A1 | 9/2010 | Dawson et al. |
| 2010/0260337 A1 | 10/2010 | Song et al. |
| 2010/0332827 A1 | 12/2010 | Garcia et al. |

OTHER PUBLICATIONS

Hamilton, II et al., Notice of Allowance for U.S. Appl. No. 12/117,866, filed May 9, 2008 (U.S. Patent No. 8,051,462 B2), dated Jul. 26, 2011.

Garcia, et al., Office Action for U.S. Appl. No. 12/326,477, filed Dec. 2, 2008 (U.S. Patent Publication No. 2010/0332827 A1), dated Jul. 26, 2011.

Garcia, et al., Notice of Allowance for U.S. Appl. No. 12/326,477, filed Dec. 2, 2008 (U.S. Patent Publication No. 2010/0332827 A1), dated Mar. 19, 2012.

CREATING AND USING SECURE COMMUNICATIONS CHANNELS FOR VIRTUAL UNIVERSES

CROSS REFERENCE TO CO-PENDING APPLICATIONS

This application is a continuation of U.S. Ser. No. 12/326,477, filed Dec. 2, 2008, and entitled "Creating and Using Secure Communications Channels for Virtual Universes," which was published on Dec. 30, 2010, as U.S. Patent Publication No. 2010/0332827 A1, and which is hereby incorporated herein by reference in its entirety. Further, commonly owned U.S. Pat. No. 8,051,462 B2, issued Nov. 1, 2011, and entitled "Secure Communication Modes in a Virtual Universe," contains subject matter related, in certain aspects, to the subject matter of the present application.

FIELD OF THE INVENTION

The present invention relates in general to virtual world program applications and more particularly, to methods and systems for creating and using secure communications channels between and amongst avatars in a virtual universe. More particularly, the present invention is directed to sequential encryption of data using the public keys of servers in a predefined data path. Even more particularly, the present invention is directed to a method for transmitting data packets through a predetermined network path using sequential decryption and encryption in a manner which insures security, especially to client avatars in a Virtual Universe.

BACKGROUND OF THE INVENTION

A Virtual Universe (VU) is a computer-based simulated environment intended for its residents to traverse, inhabit, and interact through the use of avatars. Many VUs are represented using 3-D graphics and landscapes, and are populated by many thousands of users, known as "residents." Other terms for VUs include metaverses and "3D Internet." Often, the VU resembles the real world such as in terms of physics, houses, and landscapes. Example VUs include: Second Life®, Entropia Universe®, The Sims Online™, There™, as well as massively multiplayer online games such as EverQuest®, Ultima Online™, Lineage™ or World of Warcraft®.

It should not be assumed that the utility of virtual worlds is limited to game playing, although that is certainly seen to be useful and valuable insofar as it has become a real economic reality with real dollars being exchanged. However, the usefulness of virtual worlds also includes the opportunity to run corporate conferences and seminars. It is also used to conduct virtual world classroom sessions. Governmental and instructional opportunities abound in the virtual world. Accordingly, it should be fully appreciated that the term "virtual" as applied to this technology does not in any way make it less real or less valuable than the "real" world. It is really an extension of current reality. Moreover, it is an extension that greatly facilitates human communication and interaction in a non-face-to-face fashion.

The world being computer-simulated typically appears similar to the real world, with real world rules such as gravity, topography, locomotion, real-time actions, and communication. Communication has, until recently, been in the form of text, but now real-time voice communication using VOIP is available. This type of virtual world is now most common in massively multiplayer on-line games (Second Life®, Entropia Universe®, The Sims On-line™, There, as mentioned above), and particularly in massively multiplayer, on-line, role-playing games such as EverQuest®, Ultima On-line™, Lineage™, World of Warcraft® or Guild Wars™.

In a virtual world, private communications are very difficult to ensure. Furthermore, identity management is also difficult. Most virtual world systems are proprietary, single-company-owned, both hosted and administered by the company that created the product; all access is provided by client-side software which is also provided by the same company. Nearly all data, content, and materials related to the specific virtual world are transmitted via the owning-company's networks and systems. In addition, most virtual worlds are still maturing, and the focus of existing development efforts has been on general system stability and usability, rather than business-essential supporting processes like security, confidentiality and data-protection measures. The effect of this approach has been a plethora of virtual world-related software, protocols, and networks that have little or no protection against contemporary data interception and invasion practices. In addition, the highly proprietary nature of the environment means that companies wishing to expand into virtual worlds are both unable to guarantee any level of privacy, and are extremely limited in their ability to self-implement a security solution that accommodates their specific security needs.

Existing solutions require many different processes, information systems, and software programs, each specific to a single instance/brand of virtual world, with no cross-world communication. For example, a user who uses both SecondLife® and OpenCroquet™ (two virtual world hosting systems) must create two disparate and unique IDs, and cannot communicate between the two. The solution described herein enables all of these disparate techniques in one unified software solution and information processing global network. This solution protects virtual world residents, not only from in-transit capture and analysis, but also from flow traffic analysis and other secondary analysis risks while performing transparent Identity Management and Key Management including key revocation and challenge response to Identification and Authentication. These features are available across all supported virtual worlds, providing a consistent interface regardless of which specific virtual world the user may employ.

SUMMARY OF THE INVENTION

The shortcomings of the prior art are overcome and additional advantages are provided through the provision of a computer program product for rendering avatars in a virtual universe environment. The computer program product comprises a storage medium readable by a processing circuit and storing instructions for execution by a computer for performing a method.

Additional features and advantages are realized through the techniques of the present invention. Other embodiments and aspects of the invention are described in detail herein and are considered a part of the claimed invention. Methods and systems relating to one or more aspects of the present invention are also described and claimed herein. Furthermore, services relating to one or more aspects of the present invention are also described and may be claimed herein.

The present invention creates a communication tunnel between client software and a global server network that can serve data files to the client or transmit the client's transmissions to another server and pass data files from that second server back to the client. All data transmitted through this tunnel is therefore secured against in-transit capture and analysis, timing analysis, and flow traffic analysis. Note that the term server, as mentioned herein need not be a classical web server, but rather may be any server capable of handling such traffic.

In accordance with one embodiment of the present invention, there is provided a method for secure communication for a client in a virtual universe. The method comprises several steps including intercepting a data packet to be sent by the client who determines a network path for transmission of the data packet. The data packet is sequentially encrypted in a nested fashion using the public keys of the of servers in the data path. The processed data packet is then transmitted to a first recipient in a chain of servers defined by said data path. The present invention also includes data processing systems having program instructions for carrying out the above-described method and also includes machine-readable media containing these instructions.

At each server in the path the nested packet is decrypted. Information relevant to that server and the sending client is then removed and the packet sent on to the next server in the data path. The next server in the path is identified via its public key which is exposed during the decryption process. The servers in the path may be or may have been provided with server address information linked to their public keys.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
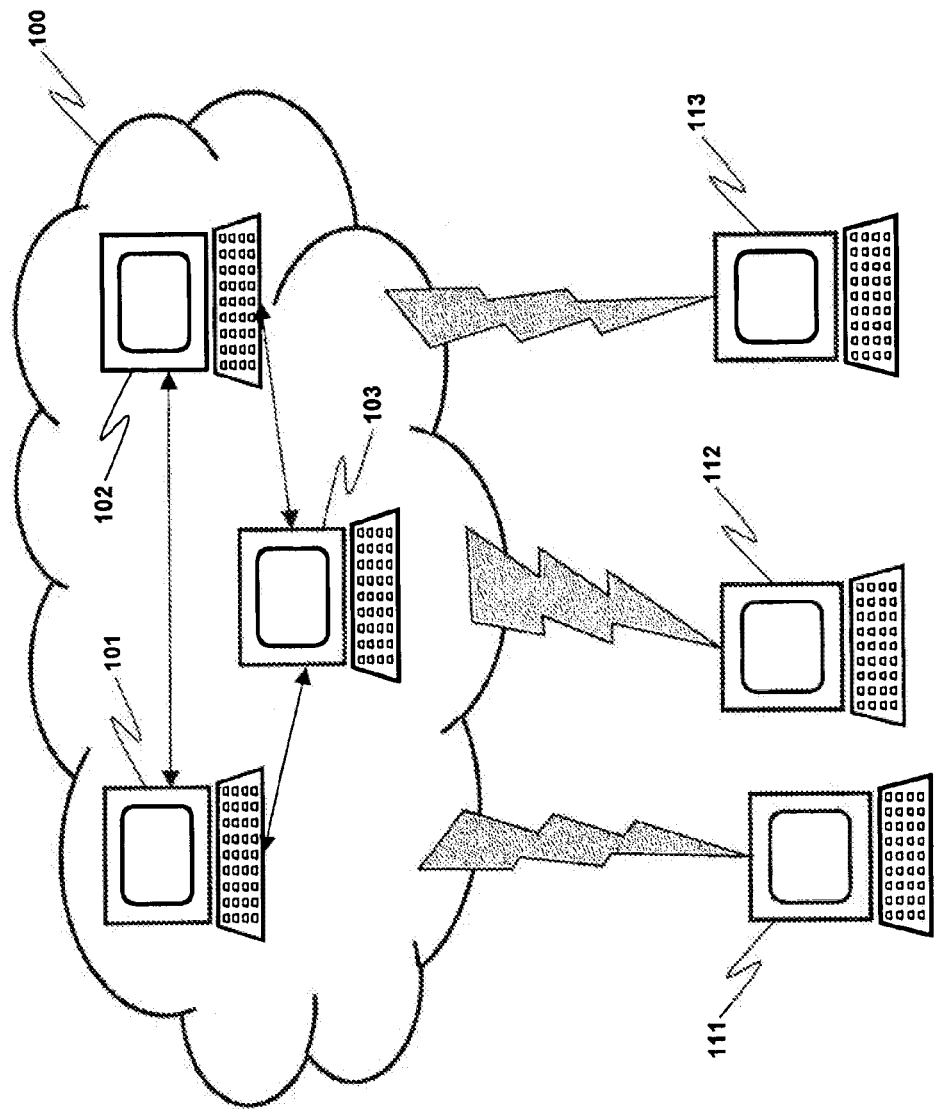
FIG. 1 is a schematic diagram illustrating a virtual world communications model without a secure channel.

In order to better understand the present invention and the advantages that it produces, it is useful to provide descriptions of some of the VU concepts and terms that are encountered. The list below is exemplary and is not intended to be all inclusive.

(1) An avatar is a graphical representation a user selects that other users can see, often taking the form of a cartoon-like human but with increasing desire to render the depiction in more realistic fashion.
(2) An agent is the user's account, upon which the user can build an avatar, and which is tied to the inventory of assets a user owns.
(3) A region is a virtual area of land within the VU.
(4) Assets, avatars, the environment, and anything visual consists of UUIDs (unique identifiers) tied to geometric data (distributed to users as textual coordinates), textures (distributed to users as graphics files such as JPEG2000 files), and effects data (rendered by the user's client according to the use's preferences and user's device capabilities).

A virtual world is a computer-based simulated environment intended for its users to inhabit and interact via avatars. This habitation is usually represented in the form of two or three-dimensional graphical representations of humanoids (or other graphical or text-based avatars). Some, but not all, virtual worlds allow for multiple users.

An understanding of the present invention is also best appreciated with knowledge of the concepts of asymmetric data encryption and public key encryption. Public key cryptography, also known as asymmetric cryptography, is a form of cryptography in which a user has a pair of cryptographic keys: a public key and a private key. The private key is kept secret, while the public key is widely distributed. The keys are related mathematically, but the private key cannot be practically derived from the public key. A message encrypted with the public key can be decrypted only with the corresponding private key. In cryptography, a public key infrastructure (PM) is an arrangement that provides for trusted third party vetting of, and vouching for, user identities. It also allows binding of public keys to users. This is usually carried out by software at a central location together with other coordinated software at distributed locations. The public keys are typically provided in certificates.

Note too that, throughout this disclosure, for clarity of presentation only, reference is made to an individual or avatar, which is a digital representative of the individual. However, it should be noted that this term not only applies to an individual, but to any computerized processes that may execute on behalf of the individual, using the same credentials and capabilities of the individual that owns/controls the process. In general, this embodies many forms, such as prescheduled, automatically running maintenance processes, system level processes (owned by the system administrator), etc. In all cases, this process is treated like an avatar, with the same inputs and outputs, regardless of whether the credentials come directly from an individual or from a computerized process acting in his or her stead.

The present invention employs software components that act as an intermediate-level communications proxy between a Virtual World client and a hosting network. The proxy component monitors the communications data stream to and from a client and actively modifies the data stream (injects/removes data) as necessary to provide a secure communications framework. This secure framework employs the use of cryptographic techniques such as public keys, public-key infrastructure, and a secondary private/secured network communications channel to provide security enablement functions. In a preferred embodiment, an overlaying window pane opens on the client workspace. All data, text, voice, video, and financial transactions placed in that window are automatically encrypted with the recipient's public key and transmitted to a web server. When using a back-end web server, users do not realize they are connected to or sending/receiving data to/from such a server. Such servers are commonly database servers, though the term is not restricted to solely database servers but rather refers to any server that does not directly interact with the client software. The security of the communications path is ensured and minimizes the risk of exposure to unprotected portions of the hosting provider's system(s). The web server is part of many different web servers located all around the world. These servers are used to provide overall communications capacity (bandwidth), and collectively work together to mask/hide the origin of secured data within the network.

A network path is created with new sender and receiver identification information being placed in each nested packet (unit of transmitted data). Each nested packet is sequentially encrypted with the public key of the next receiving web server in the network path. When the total path is thus processed the packet is sent out. The next receiving web server decrypts the packet, strips off the old sender and receiver information and sends the packet to the next receiving web server. A random time delay may be introduced to mitigate against timing analysis. At the end of the web server network, the packet is decrypted, old sender and receiver information is stripped off and the packet is sent to the ultimate receiver which is a client computer. The client computer receives the packet, decrypts it and displays the data in the overlay window.

Figure 2:
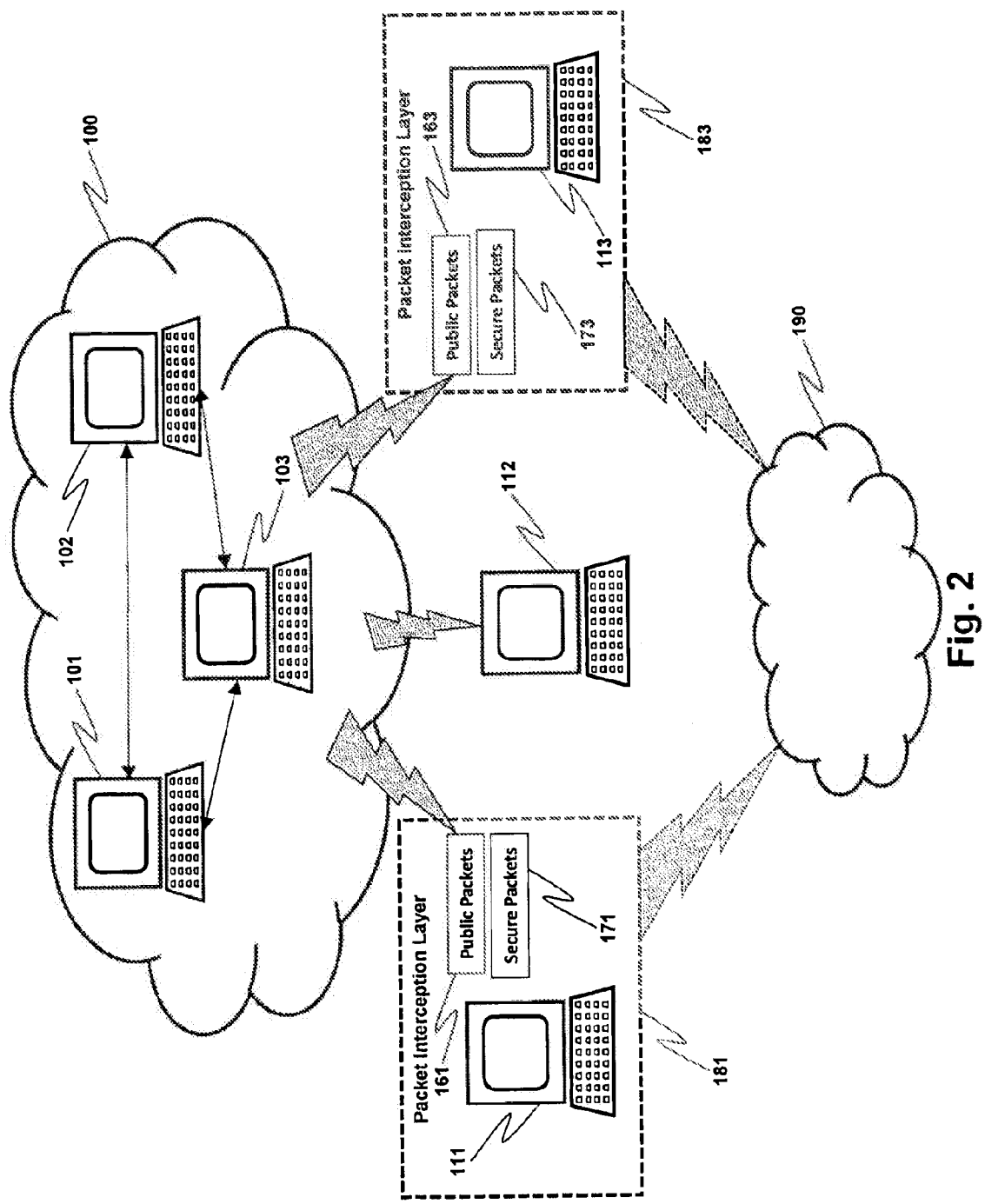
FIG. 2 is a schematic diagram illustrating a virtual world communications model with a secure channel.
Figure 3:
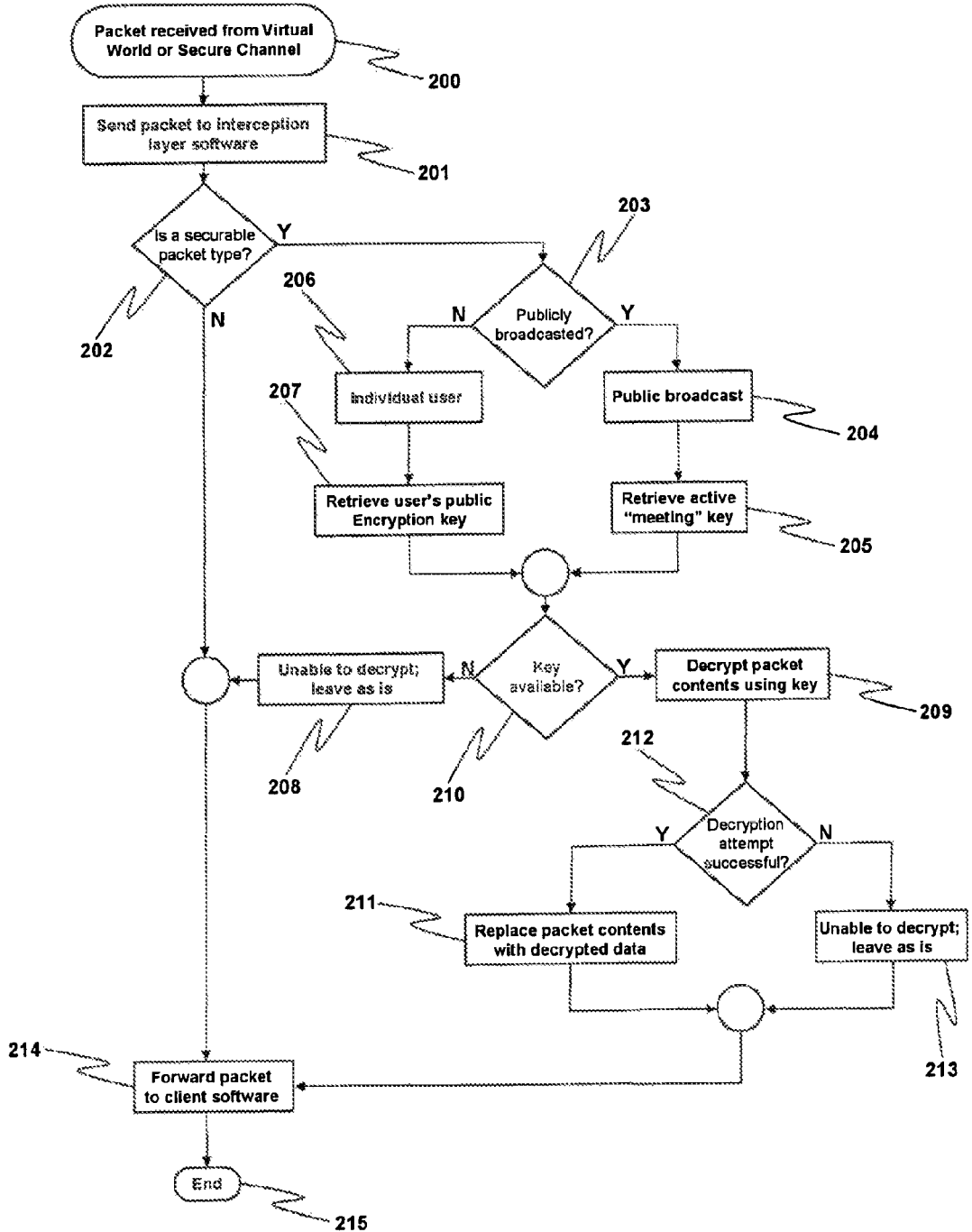
FIG. 3 is a flow diagram illustrating the method of the present invention for processing an incoming data packet from a virtual world secure communication channel.
Figure 4:
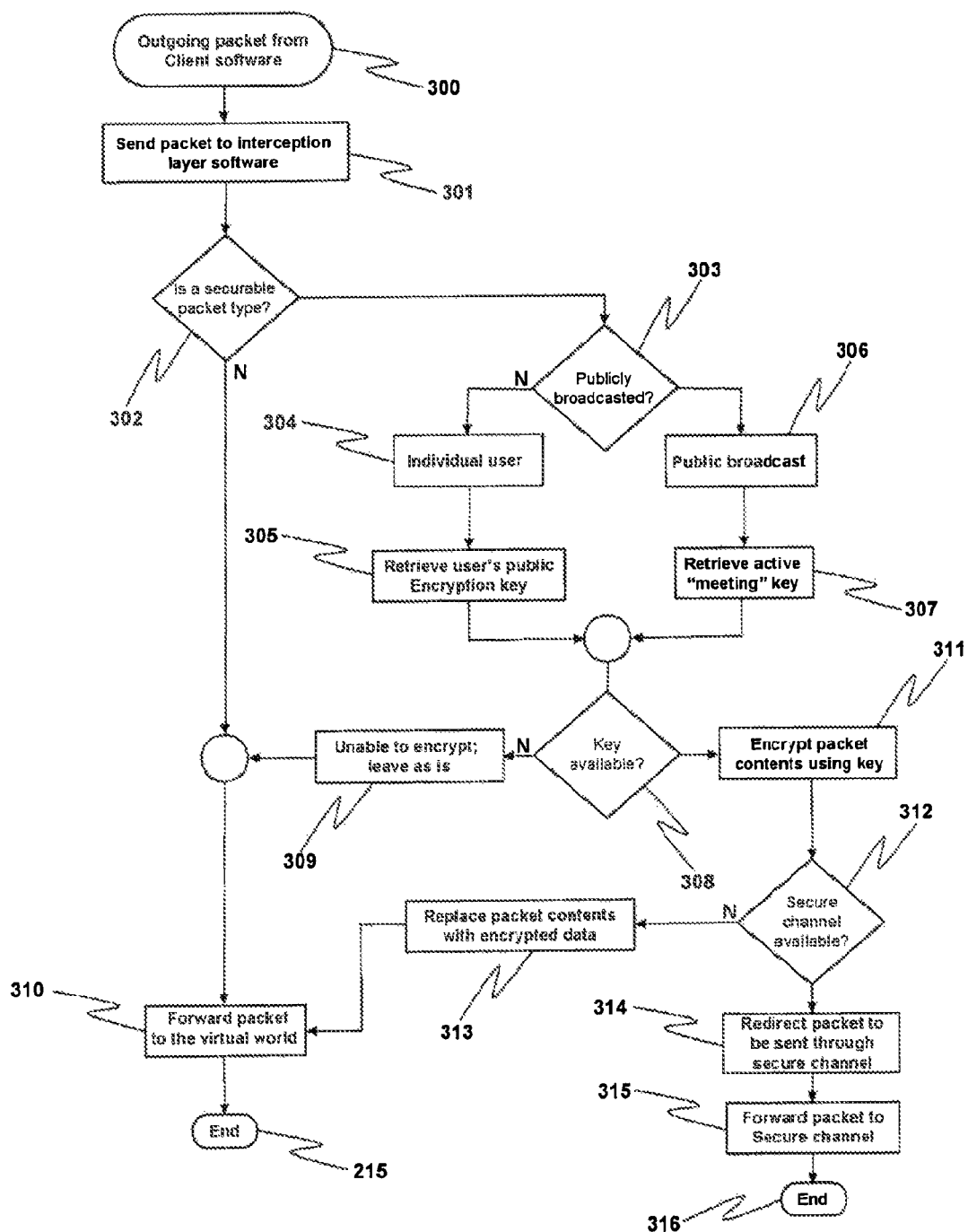
FIG. 4 is a flow diagram illustrating the method of the present invention for processing an outgoing data packet from a virtual world secure communication channel.

The structure, method and operation of the present invention is illustrated in FIGS. 2 through 4. In particular, FIG. 1 illustrates a virtual world communications model without a secure channel feature. In particular, in this model virtual worlds cluster 100 includes computer 101, 102 and 103. The structure and number of computers included in cluster 100, as shown, is exemplary only. Moreover, while the reference numerals shown are characterized as representing computers, it is also the case that in the usual mode of operation these reference numerals also represent individual users and/or the reference numerals also represent workstations or personal computers. In the unsecured environment shown in FIG. 1, communication from cluster 100 is also possible with users/computers outside of cluster such as those shown by reference numerals 111, 112 and 113.

In contrast to FIG. 1, FIG. 2 illustrates an embodiment of the present invention in which virtual world communications are provided with secure channels. In FIG. 2, existing conventional world network communication paths are shown using solid lines. In contrast, secure communication paths are shown using dashed lines. The virtual world model shown in FIG. 2 is also a seen to now include secure communications cluster 190. In the present invention, computer 111 is provided with packet interception layer 161 through which all secure communications pass. Security is provided through the use of public packets 161 and secure packets 171. The description of packet interception layer 183, public packet 163, and secure packet 173 for a computer 113 is similar to the description for computer 111. The processing of these packets is illustrated in FIGS. 3 and 4 discussed below.

FIG. 3 illustrates the processing that occurs when a packet is received from a virtual world source or from a secure channel (step 200). In either case, the packet is sent to interception layer software (see reference numerals 181 and 183 in FIG. 2; step 201). It is then determined (step 202) whether or not the packet received is a secure packet type. If it is not, the next step that is executed is step 214 in which the packet is forwarded to the client software, at which point packet reception processing ends (step 215). However, if the packet is a secure packet type, it is then determined (step 203) whether or not the packet is a publicly broadcast packet. If it is, it is identified as such (step 204) and an active meeting key is retrieved (step 205). If it is determined from step 203 that the packet is intended for an individual user, it is identified as such (step 206) and the individual user's public encryption key is retrieved (step 206). It is next determined whether or not an available key has been found (step 210). If no key is available, packet decryption is not possible and the packet is left as is (step 208) and processing continues at step 214, as described above. However, if a key is available, the packet is decrypted using the key and its contents are determined (step 209). If the decryption attempt is successful (step 212), then the packet contents are replaced with the decrypted data (step 211). However, if the decryption attempt is unsuccessful, the packet is left as is (step 213). In any event processing continues at step 214 as discussed above. This completes the description of the processing for packet reception.

Attention is now directed to the processing for processing an outgoing packet from the client software. This process is illustrated in FIG. 4. Processing begins when an outgoing packet is received from a client software (step 300). The outgoing packet is then sent to the interception layer software (step 301). It is next determined whether or not this is a securable packet type is (step 302). If it is not processing continues at step 310 at which point the packet is directly forwarded into the virtual world (step 310). However, if it is a securable packet type, it is then determined (step 303) whether or not the packet is a publicly broadcast packet. If it is, it is identified as such (step 306) and an active meeting key is retrieved (step 307). If it is determined from step 303 that the packet is intended for an individual user, it is identified as such (step 304) and the individual user's public encryption key is retrieved (step 305). It is next determined whether or not an available key has been found (step 308). If no key is available, packet encryption is not possible and the packet is left as is (step 309) and processing continues at step 214, as described above. However, is a key is available, then the packet is encrypted using the key (step 311). It is next determined whether or not a secure channel is available (step 312). If it is determined that a secure channel is not available, then the packet contents are replaced with encrypted data (step 313) and the packet is forwarded on into the virtual world (step 310). However, if it is determined that a secure channel is available, the packet is redirected to be sent through this channel (step 314) and finally the packet is forwarded to the secure channel (step 315) and the outgoing packet processing ends (step 316).

In yet another embodiment, the present invention provides a business method that performs the process steps of the invention on a subscription, advertising, and/or fee basis. That is, a service provider, such as a Solution Integrator, offers to provide methods and systems for creating and using secure communications channels between and amongst avatars in a virtual universe. In this case, the service provider creates, maintains, supports, etc., a computer infrastructure that performs the process steps of the invention for one or more customers. In return, the service provider receives payment from the customer(s) under a subscription and/or fee agreement and/or the service provider receives payment from the sale of advertising content to one or more third parties.

Figure 5:
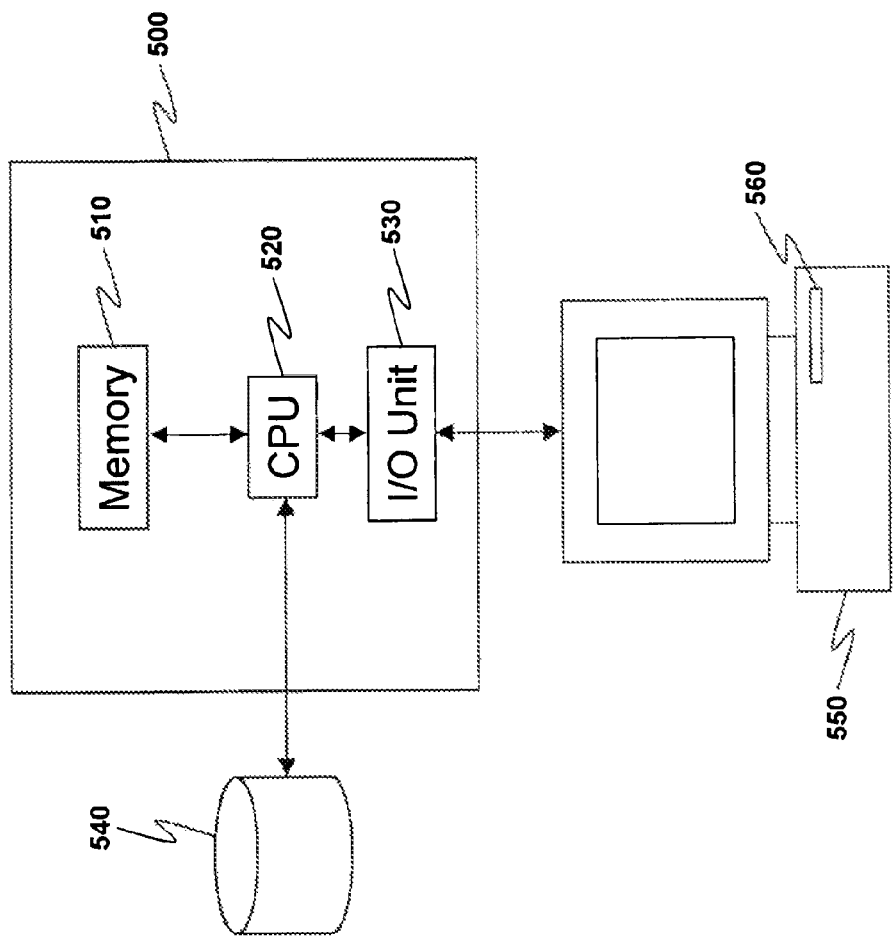
FIG. 5 is a block diagram illustrating a system which an end user typically employs the present invention.
Figure 6:
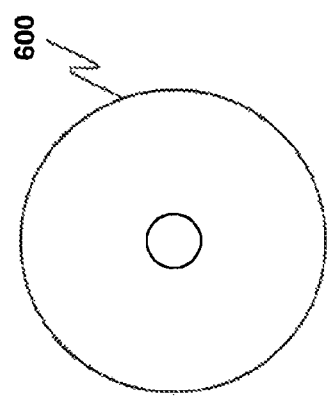
FIG. 6 illustrates one form of machine readable medium, a CD-ROM, on which program instructions for carrying out the steps of the present invention are provided.

An end user environment in which the present invention operates is shown in FIG. 5. The present invention operates through a data processing environment which effectively includes one or more of the computer elements shown in FIG. 5. While FIG. 5 is more suited for illustrating an end user environment, it is noted that a similar, albeit typically much larger, data processing system is connected via the Internet to the local environment depicted. In particular, a similar nonvolatile memory 540 is typically present at the server end to contain program instructions for carrying out the virtual reality program which are loaded into a corresponding main memory 510 for execution. Turning to a local focus, computer 500 includes central processing unit (CPU) 520 which accesses programs and data stored within random access memory 510. Memory 510 is typically volatile in nature and accordingly such systems are provided with nonvolatile memory typically in the form of rotatable magnetic memory 540. While memory 540 is preferably a nonvolatile magnetic device, other media may be employed. CPU 520 communicates with users at consoles such as terminal 550 through Input/Output unit 530. Terminal 550 is typically one of many, if not thousands, of consoles in communication with computer 500 through one or more I/O unit 530. In particular, console unit 550 is shown as having included therein device 560 for reading medium of one or more types such as CD-ROM 600 shown in FIG. 6. Media 600, an example of which is shown in FIG. 6, comprises any convenient device including, but not limited to, magnetic media, optical storage devices and chips such as flash memory devices or so-called thumb drives. Media 600 contains program code or program instructions for carrying out the method of the present invention. Disk 600 also represents a more generic distribution medium in the form of electrical signals used to transmit data bits which represent codes for the instructions discussed herein. While such transmitted signals may be ephemeral in nature they still, nonetheless constitute a physical medium carrying the coded instruction bits and are intended for permanent capture at the signal's destination or destinations.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A method for providing secure communication for a virtual universe client of a virtual universe, the method comprising:
   monitoring a communication stream to and from the virtual universe client by a proxy component between the virtual universe client and a hosting network hosting the virtual universe, the communication stream comprising communication between avatars in the virtual universe, in which the virtual universe simulates one or more real world rules including at least one of gravity, topography, or locomotion, and in which users of the virtual universe interact with the simulated one or more real world rules thereof via the avatars; and
   selectively encrypting a data packet of the communication stream, the data packet being sent by the virtual universe client to a destination, the selectively encrypting comprising:
      encrypting the data packet with one or more public keys of one or more servers of the hosting network along a data path through which the data packet is to be transmitted to the destination; and
      transmitting the encrypted data packet to a first server of the one or more servers of the hosting network;
   wherein at least one data packet of the communication stream not selected for encryption passes to the virtual universe absent encryption.

2. The method of claim 1, further comprising:
   receiving the sequentially encrypted data packet at the first server;
   decrypting the data packet with a private key of the first server; and
   removing client and first server identifying information from the data packet.

3. The method of claim 2, further comprising:
   encrypting at the first server the packet from the removing step using public key information for a next server of the one or more servers in the data path; and
   transmitting the data packet from the first server to the next server.

4. The method of claim 3, wherein the public key information for the next server is retrieved from a public source.

5. The method of claim 3, wherein the decrypting the data packet exposes the public key information of the next server, and wherein the next server is identified from the exposed public key information.

6. The method of claim 3, where a random delay is introduced prior to transmission of the data packet to the next server.

7. The method of claim 1, wherein the virtual universe client is provided with a window through which the secure communication is to be provided.

8. The method of claim 1, wherein a last server of the one or more servers in the data path performs:
   decrypting the packet that the last server receives;
   removing identifying information from the packet; and
   transmitting the packet to the destination, the destination comprising an intended client.

9. The method of claim 1, wherein the selectively encrypting comprises encrypting contents of the data packet with a public key of the destination.

10. The method of claim 9, wherein the destination receives the data packet, decrypts the contents of the data packet using a private key of the destination to obtain decrypted data, and replaces the packet contents with the decrypted data.

11. The method of claim 10, wherein an intended virtual universe client of the destination is provided with a window through which the secure communication is provided, and wherein the intended virtual universe client of the destination displays the decrypted data in the window thereof.

12. The method of claim 1, wherein the communication stream comprises at least one data packet selected for encryption and the at least one data packet not selected for encryption.

13. A computer program product for providing secure communication for a virtual universe client of a virtual universe, the computer program product comprising:
   a non-transitory storage medium readable by a processor and storing instructions for execution by the processor to perform a method comprising:
      monitoring a communication stream to and from the virtual universe client by a proxy component between the virtual universe client and a hosting network hosting the virtual universe, the communication stream comprising communication between avatars in the virtual universe, in which the virtual universe simulates one or more real world rules including at least one of gravity, topography, or locomotion, and in which users of the virtual universe interact with the simulated one or more real world rules thereof via the avatars; and
      selectively encrypting a data packet of the communication stream, the data packet being sent by the virtual universe client to a destination, the selectively encrypting comprising:

encrypting the data packet with one or more public keys of one or more servers of the hosting network along a data path through which the data packet is to be transmitted to the destination; and transmitting the encrypted data packet to a first server of the one or more servers of the hosting network;

wherein at least one data packet of the communication stream not selected for encryption passes to the virtual universe absent encryption.

14. The computer program product of claim 13, wherein the virtual universe client is provided with a window through which the secure communication is to be provided.

15. The computer program product of claim 13, wherein the selectively encrypting comprises encrypting contents of the data packet with a public key of the destination, the encrypted contents for decryption by the destination, using a private key of the destination, to obtain decrypted data for display in a window of an intended virtual universe client of the destination, wherein the secure communication is provided through the window of the intended virtual universe client of the destination.

16. The computer program product of claim 13, wherein the communication stream comprises at least one data packet selected for encryption and the at least one data packet not selected for encryption.

17. A computer system for providing secure communication for a virtual universe client of a virtual universe, the computer system comprising:

a memory; and a processor in communications with the memory, wherein the computer system is configured to perform:

monitoring a communication stream to and from the virtual universe client by a proxy component between the virtual universe client and a hosting network hosting the virtual universe, the communication stream comprising communication between avatars in the virtual universe, in which the virtual universe simulates one or more real world rules including at least one of gravity, topography, or locomotion, and in which users of the virtual universe interact with the simulated one or more real world rules thereof via the avatars; and selectively encrypting a data packet of the communication stream, the data packet being sent by the virtual universe client to a destination, the selectively encrypting comprising:

encrypting the data packet with one or more public keys of one or more servers of the hosting network along a data path through which the data packet is to be transmitted to the destination; and transmitting the encrypted data packet to a first server of the one or more servers of the hosting network;

wherein at least one data packet of the communication stream not selected for encryption passes to the virtual universe absent encryption.

18. The computer system of claim 17, wherein the virtual universe client is provided with a window through which the secure communication is to be provided.

19. The computer system of claim 17, wherein the selectively encrypting comprises encrypting contents of the data packet with a public key of the destination, the encrypted contents for decryption by the destination, using a private key of the destination, to obtain decrypted data for display in a window of an intended virtual universe client of the destination, wherein the secure communication is provided through the window of the intended virtual universe client of the destination.

20. The computer system of claim 13, wherein the communication stream comprises at least one data packet selected for encryption and the at least one data packet not selected for encryption.

* * * * *